United States Patent [19]

Seliber

[11] 3,724,229

[45] Apr. 3, 1973

[54] COMBINATION LIQUEFIED NATURAL GAS EXPANSION AND DESALINATION APPARATUS AND METHOD

[75] Inventor: Joseph Seliber, Wilmette, Ill.

[73] Assignee: Pacific Lighting Service Co., Los Angeles, Calif.

[22] Filed: Feb. 25, 1971

[21] Appl. No.: 118,668

[52] U.S. Cl. ..........................62/52, 62/58, 62/123
[51] Int. Cl. ..............................................F17c 7/02
[58] Field of Search.......................62/52, 53, 123, 58

[56] References Cited

UNITED STATES PATENTS

| | | | |
|---|---|---|---|
| 3,535,210 | 10/1970 | Linde et al............................62/52 X |
| 3,478,531 | 11/1969 | Karnofsky...............................62/123 |
| 3,266,261 | 8/1966 | Anderson....................................62/52 |
| 2,759,882 | 8/1956 | Worthen et al..........................62/268 |
| 2,957,607 | 3/1961 | Bodle..........................................62/52 |
| 3,018,634 | 1/1962 | Gilmore......................................62/52 |
| 3,183,666 | 5/1965 | Jackson...................................62/52 X |

Primary Examiner—Meyer Perlin
Assistant Examiner—Ronald C. Capossela
Attorney—Christie, Parker & Hale and Richard D. Seikel

[57] ABSTRACT

A method and combined apparatus for vaporizing liquefied natural gas and expanding the gas through a turbine for generating power is described. The energy for heating the liquefied natural gas for vaporization is obtained by transferring heat from sea water or other saline water. The water, so cooled, is then passed to a vacuum freezing, vapor compression system for obtaining fresh water and brine. In another embodiment, cooling of sea water is obtained from cold natural gas already expanded through a first turbine for producing shaft horsepower. Energy for vaporizing and expanding the liquefied natural gas is obtained by transferring heat from compressed air. The air so cooled is liquefied and fractionated to produce liquid nitrogen and either liquid or gaseous oxygen. In both embodiments shaft horsepower from the turbines is coupled to the compressor of the vacuum freezing, vapor compression apparatus. The power available from natural gas expansion is augmented by power from a steam or gas turbine. Waste heat from the turbine is employed for distillation desalination. If desired, an electrical generator can be coupled to the turbines for providing peaking power.

14 Claims, 3 Drawing Figures

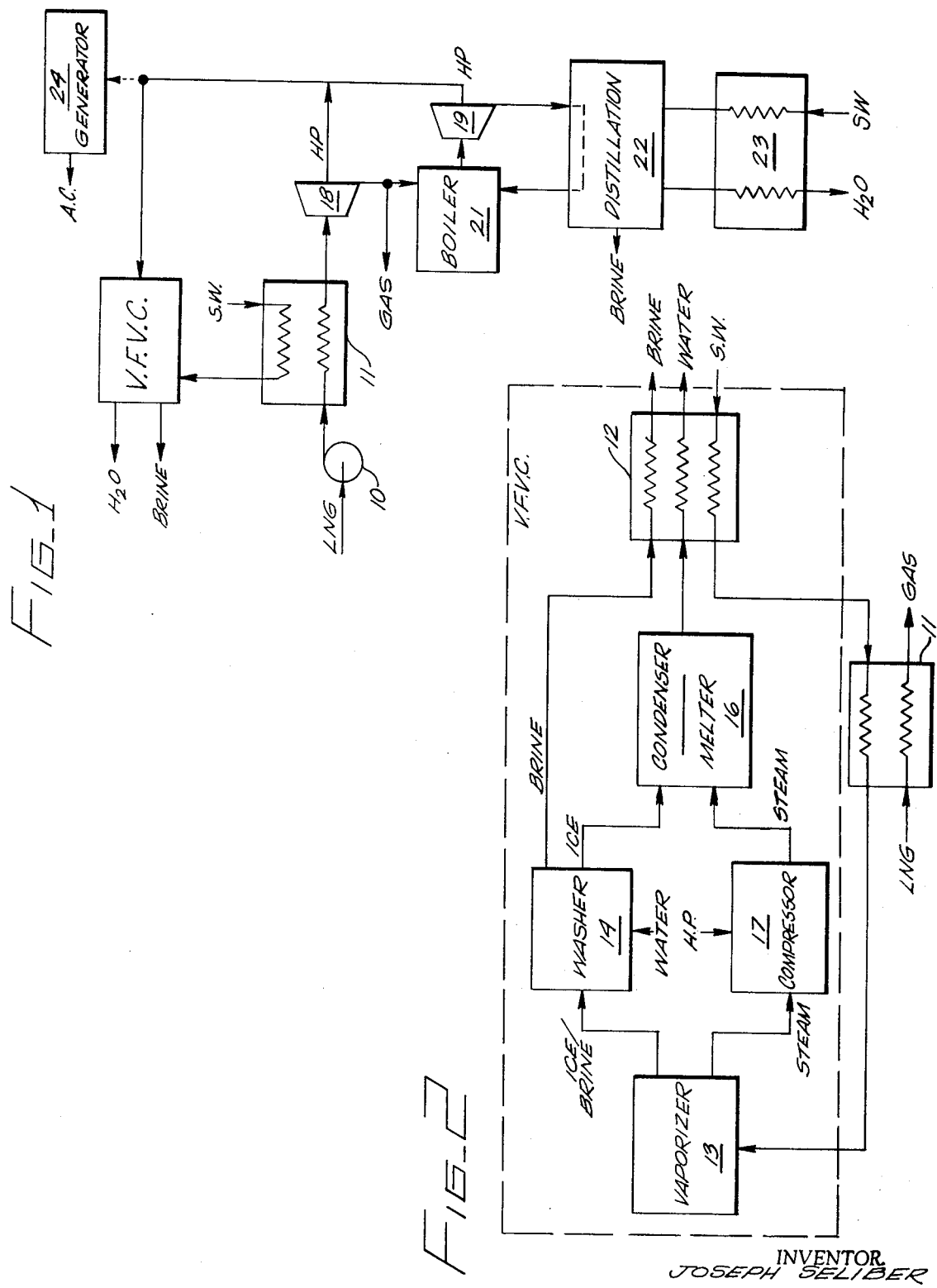

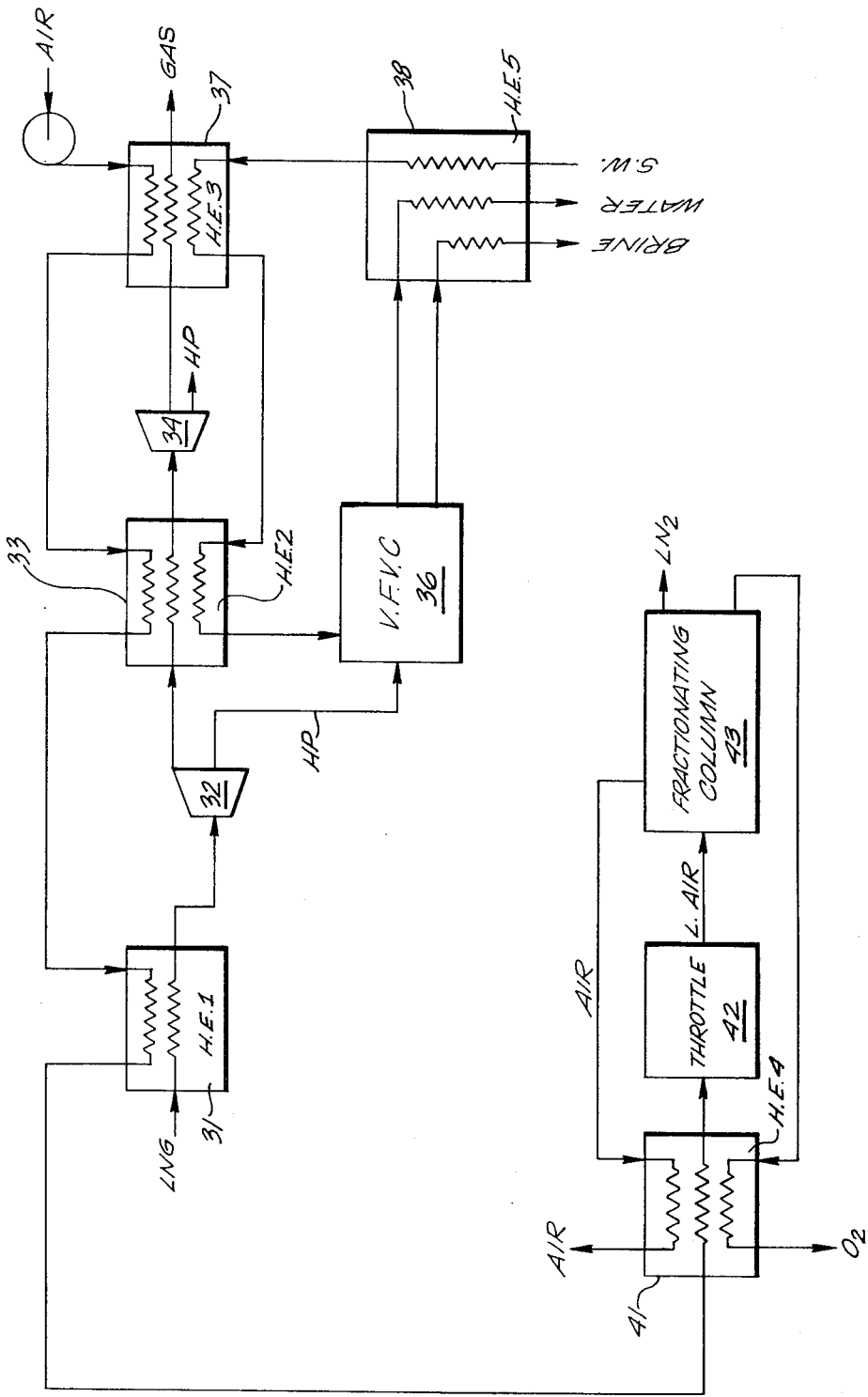

COMBINATION LIQUEFIED NATURAL GAS EXPANSION AND DESALINATION APPARATUS AND METHOD

BACKGROUND

Transport of liquefied natural gas in special ships has become a practical reality for moving gas from production sites to utilization areas along a sea coast. The natural gas is liquefied in the production field so that its temperature and volume are greatly reduced as compared with the natural gas in vapor form. When the liquefied natural gas reaches a distribution point near a utilization region, heat is added for revaporizing the gas which is then transported by pipelines or the like to the ultimate consumer.

Liquefied natural gas at atmospheric pressure has a boiling point of about −259°F. To produce liquefied natural gas from atmospheric pressure natural gas at 80°F requires the extraction of about 390 BTU per pound of gas. A large amount of refrigeration is required to cool sufficient quantities of natural gas for economic transportation and this refrigeration is available in the liquefied natural gas at the point of revaporization. To date, no significant use has been made of the large amount of refrigeration available with shipload quantities of liquefied natural gas.

A significant and developing problem in many regions of the world is the availability of fresh water in large quantities. In many places the cost of fresh water has become sufficiently high that recovery from sea water or other saline waters has become economical. Two broad techniques for recovery of fresh water from saline waters are available that involve change of phase of the water. In one of these techniques, fresh ice is formed and separated from concentrated brine and the separated ice is remelted to yield fresh water. In another process, fresh water vapor is distilled from saline water to produce fresh water and brine. In either of these processes, a relatively large amount of energy is required for causing the necessary phase changes.

Since liquefied natural gas and saline water are both available at sea coast areas it becomes highly desirable to provide a process wherein the energy available in liquefied natural gas may be employed for economical desalination.

BRIEF SUMMARY OF THE INVENTION

Thus in practice of this invention according to a presently preferred embodiment there is provided a combination natural gas vaporization and water desalination method and apparatus wherein cold natural gas and saline water are brought into heat exchange relation for cooling the saline water and heating the natural gas. The natural gas is expanded through a turbine for generating shaft horsepower. Means are also provided for freezing ice from the saline water and recovering fresh water from the ice. Shaft horsepower from the turbine is employed in the freezing and recovery operations.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in block diagram form a combination natural gas vaporization and water desalination apparatus constructed according to principles of this invention;

FIG. 2 illustrates in block flow sheet form a vacuum freezing, vapor compression apparatus useful in practice of this invention; and FIG. 3 illustrates in block flow sheet a combination natural gas vaporization and water desalination apparatus also producing liquid nitrogen.

FIG. 1 illustrates in a block diagram flow sheet a combination natural gas vaporization and water desalination apparatus constructed according to principles of this invention. As illustrated in this presently preferred embodiment, liquefied natural gas (LNG) is fed to a conventional pressurizing pump 10 the outlet of which is connected to a heat exchanger 11. Since the individual pieces of apparatus involved in practice of this invention are conventional they are indicated only in block form in the drawings and generally speaking the details of the apparatus do not form a part of this invention.

It will also be apparent that a variety of valves, metering devices, temporary storage reservoirs, and other elements are present in a practical system. However, these are apparent to one skilled in the art and are not set forth in detail herein. For just one example, liquefied natural gas is typically imported in ship load batches and it is desirable to unload the vessel as quickly as possible to minimize demurrage. The process for vaporizing the natural gas and desalting water is, however, substantially continuous and therefore a suitable reservoir for temporary storage of liquefied natural gas is typically employed. Many other such examples will be apparent to one skilled in the art.

As another input to the heat exchanger 11, and flowing counter current to the natural gas, is sea water (SW). The sea water and natural gas are brought into heat transfer relation in the heat exchanger so that heat in the sea water is transferred to natural gas thereby providing the latent heat of vaporization of the gas and further heating the cold vaporized gas towards ambient temperature, thereby causing substantial increases in volume of the gas. At the same time the sea water is cooled by contact with the very low temperature natural gas and typically the sea water is cooled to a temperature of about 24° to 28°F.

The sea water so cooled is then passed to a conventional vacuum freezing, vapor compression desalination apparatus (VFVC). FIG. 2 illustrates in block form a typical vacuum freezing, vapor compression apparatus. As seen in this figure, sea water (SW) is typically passed through a heat exchanger 12 to effect a degree of precooling. Thereafter the sea water passes to the low temperature heat exchanger 11 where it gives up additional heat to liquified natural gas. In this and other Figures plural heat exchangers are shown and it will be understood that these may be partly in parallel rather than entirely in series to provide appropriate heat and mass transfer at desired temperatures.

From the low temperature heat exchanger the cooled sea water then passes to a spray type vaporizer 13 which typically directs a fine spray of water into an evacuated chamber (not shown). A deaerator for the sea water is also desirable but not shown herein. Vaporization of water from the spray droplets extracts latent heat thereby cooling the droplets so that small crystals of ice are formed. Products from the vaporizer are thus steam or water vapor and a slurry of ice crystals in somewhat concentrated brine. Typically evaporation of one pound of steam produces 7.5 pounds of ice. It is found that, so long as only a portion of the water in the droplets is frozen, the ice crystals so formed are substantially free of salt and when separated and melted provide fresh water. The ice-brine slurry is then passed to a washer 14 where the ice and brine are separated and fresh cold water is added to wash residual brine from the surfaces of the ice crystals. The cold brine is then passed to the heat exchanger 12 to flow counter current to incoming sea water for precooling. The separated ice crystals are passed to a condenser/melter 16.

At the same time the steam or water vapor flows to a compressor 17 where its pressure may be increased from, for example, about 3.5 millimeters of mercury to about 5 millimeters of mercury pressure absolute. In order to effect this compression a substantial amount of power (HP) in the form of rotating shaft horsepower must be applied to the compressor. The somewhat compressed steam or water vapor from the compressor 17 then flows to the condenser/melter 16 where it is co-mingled with the ice crystals from the washer 14. The compressed, and thereby heated, vapor condenses on the ice crystals and the latent heat of vaporization balances the heat required for melting so that cold fresh water is produced. The cold water produced in the condenser/melter is passed through through the heat exchange 12 in heat transfer relation to incoming sea water for precooling thereof.

Referring again to FIG. 1, natural gas from the heat exchanger 11 is passed through a conventional turbine 18 where the expansion of the natural gas to a lower pressure generates shaft horsepower. Thus, the mechanical energy of expansion of the liquefied natural gas is converted to mechanical energy in the form of shaft rotation. The power so generated is employed directly in the compressor 17 (FIG. 2) in the vacuum freezing, vapor compression desalination portion of the system.

Based on a compressor efficiency of about 90 percent the power requirement is about 52,000 horsepower to produce 150 million gallons of water per day. The mechanical energy available from liquefied natural gas expansion provides approximately 27,500 horsepower in a unified plant capable of handling 500 million cubic feet of natural gas per day. The refrigeration available from this size liquefied natural gas expansion plant balances the refrigeration requirements of a 150 million gallon per day desalination plant. The additional shaft horsepower required to operate the compressor 17 for desalination is obtained from an additional turbine 19 which can be either a conventional gas turbine or steam turbine.

In the embodiment illustrated in FIG. 1 a portion of the natural gas from the first turbine 18 operating on natural gas expansion is burned to heat a conventional steam boiler 21 for producing steam in a closed loop system. The steam operates the non-condensing turbine 19 and in this embodiment passes to a conventional distillation unit 22 where waste heat is utilized. Sea water SW passes through a heat exchanger 23 and into the distillation unit 22. The distillation unit can be either a multi-effect, multi-stage, multi-distillation system as have been developed for desalination applications. In either of these systems a portion of the sea water entering the system is evaporated to produce fresh water vapor and a somewhat concentrated brine which is discharged from the system. The water vapor returns to the heat exchanger 23 for heat transfer and preheating of the sea water SW. This condenses the water vapor, and fresh water is obtained from the system. Distillation desalination is not necessary in the steam loop and hot steam may be returned to the boiler 21. Waste heat in boiler exhaust may be employed for desalination.

A particular advantage of the combined system illustrated in FIG. 1 is the possibility of connection of the available shaft horsepower to a conventional AC generator 24 as required. In any electrical distribution system it is important to have sufficient generating capacity to provide for peak loads at such times as power requirements are high. This requirement for peaking power requires standby equipment that may sit idle for substantial periods of time. In a combined natural gas expansion and water desalination apparatus the turbines employed for the water vapor compressor are available for substantially continuous use with diversion of the available power to either the desalination operation or for peaking power as may be required at the moment. The excess generating capacity for peaking power service is thus available without large capital investment that must remain idle for substantial time periods. More nearly continuous utilization of capital equipment is a significant benefit of the combined system.

FIG. 3 illustrates in block form another embodiment of combined liquefied natural gas expansion and water desalination system. As illustrated in this embodiment liquefied natural gas is passed through a heat exchanger 31 and the mechanical energy of expansion is converted to shaft horsepower by means of a conventional turbine 32. In the illustrated arrangement the liquefied natural gas is brought into heat exchange relation with dry compressed air in the heat exchanger 31 for substantially cooling the compressed air and vaporizing the natural gas.

It will be noted in this embodiment that the liquefied natural gas is not significantly pressurized prior to entry in the heat exchanger 31 whereas in the embodiment illustrated in FIG. 1 it is preferred to initially pressurize the liquefied natural gas. Pressurization of the liquefied natural gas increases its boiling point and better thermodynamic efficiency is obtained in heat exchange with sea water and subsequent gas expansion in a system such as that illustrated in FIG. 1. It is preferred, however, in cooling air, to achieve a lower final temperature in the air and therefore pressurization of the liquefied natural gas is preferably minimized in such a system. It might be noted that the energy obtained by expansion of the vaporized natural gas is increased by pressurization by an amount greater than the energy required for pressurizing the liquid natural gas due to its low compressibility.

Cold natural gas from the turbine 32 passes through a second heat exchanger 33 where it is brought into heat exchange relation with compressed air and also sea water. The gas from the expansion turbine 32 is still quite cold and substantial precooling of the air and sea water is obtained. The natural gas from the heat exchanger 33 is applied to a second turbine 34 for producing additional shaft horsepower which can be applied to the compressor of a vacuum freezing, vapor compression desalination apparatus 36. Even with the multiple expansion turbines 32 and 34 the shaft horsepower available in the combined system may be insufficient for operating the desalination compressor and additional shaft horsepower may be provided by a conventional gas or steam turbine (not shown).

Cool natural gas from the second expansion turbine 34 is then passed through a third heat exchanger 37 before passing into utility pipelines for transmission to the ultimate consumers. Sea water SW is precooled in a heat exchanger 38 by the cold fresh water and brine from the VFVC desalination apparatus 36. The sea water is further cooled by heat exchange with the cool natural gas in the heat exchanger 37 and with even colder natural gas in the heat exchanger 33 before it passes to the desalination apparatus 36. Thus a substantial amount of the refrigeration capacity of the liquefied natural gas is employed in desalination of water with the mechanical energy of natural gas expansion also being employed in the desalination operation. Since a portion of the refrigeration cools air instead of sea water the desalination capacity is less and the shaft horsepower from gas expansion may be sufficient to operate the compressor of the desalination apparatus without auxiliary power.

An air compressor 39 causes compressed air to flow counter current to the expanding natural gas through the heat exchangers 37, 33 and 31, respectively. This heat exchange contact with the natural gas yields compressed air cooled to approximately the boiling point of the liquefied natural gas. The compressed air is further cooled in a heat exchanger 41 and then passes to a conventional throttle where expansion causes liquefaction of a portion of the cooled air. A mixture of gaseous and liquid air is passed to a conventional fractionating column 43 where the mixture is separated into useful components.

Cold nitrogen rich air is recycled to the heat exchanger 41 for further precooling the incoming compressed air to the liquefaction plant and if desired, additional heat exchangers may be employed for extracting the full refrigeration potential from the cold air discharged from the heat exchanger 41. Another product of the fractionating column 43 is liquid oxygen which is recycled to the heat exchanger 41 for further chilling the incoming compressed air and vaporization of the oxygen to produce gaseous oxygen for which a large market exists. If desired, the liquid oxygen produced from the liquefaction plant can be employed directly rather than being used in the heat exchanger 41 for precooling incoming compressed air.

A third product of the liquifaction plant is liquid nitrogen $LN_2$. Liquid nitrogen has an atmospheric pressure boiling point of about −320°F and is preferably loaded into ships used for hauling liquified natural gas to the plant. The cold liquid nitrogen so produced is then transported back to the site where the natural gas is produced and is used in the liquefaction process. Liquid nitrogen back hauled in a natural gas liquefaction system is described in U. S. Pats. No. 3,034,309 (Muck) and No. 3,400,547 (Williams, et al.).

A combination plant as illustrated in FIG. 3 having liquefied natural gas expansion for obtaining shaft horsepower, combined with both heat exchange to sea water for desalination and also to compressed air for liquid nitrogen production, is advantageous in that the refrigeration potential and mechanical energy potential of the liquefied natural gas are economically utilized. Such a system also provides great operational flexibility since mass flow through the system can be adjusted as required to produce greater or lesser quantities of fresh water and correspondingly lesser or greater quantities of liquid nitrogen as may be required at any particular time.

Although limited embodiments of combined natural gas vaporization and desalination apparatus and methods have been described and illustrated herein, many modifications and variations have been disclosed in the description of the systems. Another typical modification is to employ an intermediate heat transfer loop filled with propane or ethane between the cold liquefied natural gas and the air for better thermodynamic efficiency of heat transfer. Many other modifications and variations will be apparent to one skilled in the art and it is therefore to be understood that within the scope of the appended claims this invention may be practiced otherwise than as specifically described.

What is claimed is:

1. A combination natural gas vaporization and water desalination apparatus comprising:
   a heat exchanger;
   means for supplying cold natural gas to the heat exchanger;
   means for supplying saline water to the heat exchanger in heat exchange relation with the cold natural gas;
   turbine means connected to the natural gas outlet from the heat exchanger for converting natural gas expansion to shaft horsepower;
   means for vaporizing water and forming ice connected to the saline water outlet from the heat exchanger;
   means for compressing water vapor;
   means for contacting compressed water vapor and ice for condensing vapor and melting ice; and
   means for recovering fresh water from the ice; and wherein
   the turbine means are coupled to the means for compressing.

2. A combination as defined in claim 1 wherein liquefied natural gas is supplied to the heat exchanger; and further comprising:
   compressor means for pressurizing liquefied natural gas.

3. A combination as defined in claim 1 further comprising:
   second turbine means for generating additional shaft horsepower and coupled to the means for compressing;
   means for burning natural gas from the first turbine means for generating steam; and means for operating the second turbine means with the steam.

4. A combination as defined in claim 3 further comprising;
means for distilling saline water with heat from the second turbine means.

5. A combination as defined in claim 3 further comprising;
electrical generator means;
means for coupling the generator means to the turbine means for generating electricity.

6. A combination natural gas vaporization and water desalination apparatus comprising:
a first heat exchanger;
means for supplying liquefied natural gas to the first heat exchanger;
means for supplying pressurized air to the first heat exchanger in heat transfer relation to liquefied natural gas.
means for liquefying at least a portion of the pressurized air;
a second heat exchanger;
means for conveying cold natural gas from the first heat exchanger to the second heat exchanger;
means for supplying saline water to the second heat exchanger in heat exchange relation with the cold natural gas;
first turbine means connected to the natural gas outlet from the first heat exchanger and an outlet coupled to the inlet of the second heat exchanger for converting natural gas expansion to shaft horsepower;
second turbine means having an inlet coupled to the natural gas outlet from the second heat exchanger for converting natural gas expansion to shaft horsepower;
means for freezing ice connected to the saline water outlet from the second heat exchanger; and
means for recovering fresh water from the ice.

7. A combination as defined in claim 6 wherein the means for freezing and means for recovering comprises:
means for vaporizing water and forming ice;
means for compressing water vapor; and
means for contacting compressed water vapor and ice for condensing vapor and melting ice; and wherein
the first and second turbine means are coupled to the means for compressing.

8. A combination as defined in claim 6 further comprising means for separating liquid nitrogen from liquefied air.

9. A combination as defined in claim 8 further comprising means for recovering oxygen from the liquefied air.

10. A combination natural gas vaporization and water desalination method comprising the steps of:
exchanging heat between relatively colder natural gas and relatively warmer saline water;
generating shaft horsepower from expanding natural gas;
vaporizing a portion of the cooled saline water and forming ice and concentrated brine;
separating the ice from the brine;
compressing the water vapor by direct application of the shaft horsepower; and
contacting the separated ice and compressed water vapor for condensing vapor and melting ice.

11. A method as defined in claim 10 wherein liquefied natural gas is brought into heat exchange relation with the sea water; and further comprising the step of:
pressurizing the liquefied natural gas prior to exchanging heat with the sea water.

12. A method as defined in claim 10 further comprising the steps of augmenting shaft horsepower with energy obtained from burning natural gas; and
distilling saline water with heat from the burning natural gas.

13. A combination natural gas vaporization and water desalination method comprising the steps of:
exchanging heat between liquefied natural gas and compressed air;
liquefying at least a portion of the cooled compressed air;
exchanging heat between relatively colder natural gas from the first exchanging step and relatively warmer saline water;
generating shaft horsepower from expanding natural gas;
vaporizing a portion of the cooled saline water and forming ice and concentrated brine;
separating the ice from the brine;
compressing the water vapor by direct application of the shaft horsepower; and
contacting the separated ice and compressed water vapor for condensing vapor and melting ice.

14. A method as defined in claim 13 further comprising the step of separating liquid nitrogen from the liquefied air.

* * * * *